US012667447B2

(12) United States Patent
Suwayyid

(10) Patent No.: US 12,667,447 B2
(45) Date of Patent: Jun. 30, 2026

(54) DENTAL HANDPIECE FOR DRILLING AND SUCTIONING

(71) Applicant: Imam Abdulrahman Bin Faisal University, Dammam (SA)

(72) Inventor: Maryam Ibrahim Suwayyid, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 113 days.

(21) Appl. No.: 18/776,504

(22) Filed: Jul. 18, 2024

(65) Prior Publication Data

US 2026/0020933 A1 Jan. 22, 2026

(51) Int. Cl.
*A61C 1/05* (2006.01)
*A61C 1/00* (2006.01)
*A61C 1/12* (2006.01)

(52) U.S. Cl.
CPC ............ *A61C 1/055* (2013.01); *A61C 1/0092* (2013.01); *A61C 1/12* (2013.01)

(58) Field of Classification Search
CPC ......... A61C 1/055; A61C 1/0092; A61C 1/12; A61C 1/10; A61C 17/08; A61C 17/096; A61C 17/0202; A61C 17/0208; A61C 3/02
USPC .......................................................... 433/25
See application file for complete search history.

(56) References Cited

U.S. PATENT DOCUMENTS 3,092,908 A * 6/1963 Flatland .................... A61C 1/05
415/111
3,324,553 A * 6/1967 Borden ..................... A61C 1/05
279/96

3,775,849 A * 12/1973 Condon ................. A61C 1/087
433/125
5,275,558 A * 1/1994 Seney ..................... A61C 1/055
433/84
5,334,013 A * 8/1994 Meller ..................... A61C 1/05
433/132
5,531,722 A * 7/1996 Van Hale ............... A61C 1/052
433/116

(Continued)

FOREIGN PATENT DOCUMENTS

JP 4512728 B2 7/2010

OTHER PUBLICATIONS

Fatma Taha, et al., "Evaluation of helix test versus bowie dick test as a chemical indicator for assessment of sterilization of dental handpiece", Alexandria Dental Journal, Jan. 29, 2024.

*Primary Examiner* — Matthew M Nelson
(74) *Attorney, Agent, or Firm* — Oblon, McClelland, Maier & Neustadt, L.L.P.

(57) ABSTRACT

A dental handpiece for drilling and suctioning includes a handle including multiple tubes extending along the handle from a first end of the handle to a second end of the handle. The dental handpiece also includes a head, connected to the first end of the handle, including a fluid nozzle connected to a first tube and a turbine operatively connected to an attachment unit to engage a dental burr and a second tube. The dental handpiece further includes a suction system, attached to the head, for suctioning inside an oral cavity including a suction head. The suction head is connected to a third tube via a 360-degree rotation tube configured to rotate the suction head. The second end of the handle and the multiple tubes are configured to engage in a main dental instrument.

8 Claims, 2 Drawing Sheets

(56)  References Cited

U.S. PATENT DOCUMENTS

| | | | | |
|---|---|---|---|---|
| 5,554,026 | A * | 9/1996 | Van Hale | A61C 17/0208 |
| | | | | 433/91 |
| 2007/0244425 | A1 * | 10/2007 | Pond | A61M 1/774 |
| | | | | 604/27 |
| 2010/0190133 | A1 * | 7/2010 | Martinez | A61C 17/0208 |
| | | | | 604/319 |
| 2010/0233649 | A1 * | 9/2010 | McPeek | A61C 1/07 |
| | | | | 433/86 |
| 2011/0020765 | A1 * | 1/2011 | Maxwell | A61C 17/02 |
| | | | | 433/119 |
| 2016/0095680 | A1 * | 4/2016 | Kim | A61C 17/08 |
| | | | | 433/216 |
| 2016/0270878 | A1 * | 9/2016 | Fulton, III | A61C 17/08 |
| 2020/0268491 | A1 * | 8/2020 | Shotton | A61C 5/40 |
| 2020/0390532 | A1 * | 12/2020 | Racine | A61C 17/0208 |
| 2021/0085837 | A1 * | 3/2021 | Fulton, III | A61B 1/015 |
| 2021/0121275 | A1 * | 4/2021 | Parham | A61C 5/40 |
| 2021/0330425 | A1 * | 10/2021 | Yang | A61C 1/0061 |
| 2022/0233291 | A1 * | 7/2022 | DeZan | A61C 5/46 |
| 2023/0001428 | A1 * | 1/2023 | Lin | A61C 17/20 |
| 2023/0149137 | A1 * | 5/2023 | Badia Farré | A61C 1/00 |
| | | | | 433/29 |
| 2023/0233297 | A1 * | 7/2023 | Köhrer | A61C 5/40 |
| | | | | 433/91 |
| 2023/0363853 | A1 * | 11/2023 | Spironelli Ramos | A61C 5/40 |
| 2024/0335252 | A1 * | 10/2024 | Bergheim | A61C 19/066 |
| 2024/0341916 | A1 * | 10/2024 | Mahabob | A61C 1/055 |
| 2025/0281260 | A1 * | 9/2025 | Spironelli Ramos | A61C 5/40 |

* cited by examiner

DENTAL HANDPIECE FOR DRILLING AND SUCTIONING

BACKGROUND

Technical Field

The present disclosure is directed to dental instruments, more specifically to a dental handpiece designed for integrated and efficient drilling and suction operations during dental procedures.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Dental handpieces, also known as dental drills, are tools in dentistry, used primarily for cutting hard tooth tissue during cavity preparation, prosthetic fittings, and other procedures. These devices typically incorporate features for drilling powered by a turbine or motor and may include a system for delivering water to the cutting site to cool and clear debris. While conventional dental handpieces effectively perform their primary function of drilling, they often lack efficient integrated suction capabilities. This requires dentists to frequently interrupt procedures to manually clear the oral cavity of debris and fluids, or to use additional suction equipment operated by an assistant. Such interruptions prolong the dental procedures and also complicate the operational workflow, potentially increasing patient discomfort and reducing procedural efficiency.

Conventional solutions involve the use of separate instruments for drilling and suction. Typically, a dental assistant manages the suction device to remove saliva, blood, and debris during drilling operations. Some dental handpieces attempt to integrate both functionalities, but these attempts often result in bulky or ergonomically unwieldy tools that can be difficult to maneuver within the confines of the patient's oral cavity. Integrated systems generally do not offer flexibility or efficiency. For instance, the external suction connection in these handpieces can be bulky and may restrict the handpiece's maneuverability. Additionally, the suction port or channel may not always be properly positioned for effective debris and fluid removal, potentially leading to reduced visibility and increased risk of complications.

Accordingly, it is one object of the present disclosure to provide a dental tool that integrates efficient drilling and powerful suction capabilities in a single, ergonomically designed unit, without compromising maneuverability or suction effectiveness. The present disclosure aims to address these needs by providing a dental handpiece that combines suction function with traditional drilling functions, configured for ease of use and maintenance, thus significantly improving procedural efficiency in dental care.

SUMMARY

In an exemplary embodiment, a dental handpiece for drilling and suctioning is described. The dental handpiece includes a handle including a plurality of tubes extending along the handle from a first end of the handle to a second end of the handle. The dental handpiece also includes a head including a fluid nozzle connected to a first tube of the plurality of tubes and a turbine operatively connected to an attachment unit configured to engage a dental burr and a second tube of the plurality of tubes. The head is connected to the first end of the handle. The dental handpiece further includes a suction system for suctioning inside an oral cavity including a suction head. The suction system is attached to the head. The suction head is connected to a third tube of the plurality of tubes via a 360-degree rotation tube configured to rotate the suction head. Herein, the second end of the handle and the plurality of tubes are configured to engage in a main dental instrument.

In some embodiments, the suction system is attached to an opposite side of the attachment unit of the head.

In some embodiments, the suction head is U-shaped.

In some embodiments, the suction head is detachable.

In some embodiments, the third tube of the plurality of tubes further comprises a cover.

The cover tightly closes the second tube when the suction head is detached.

In some embodiments, the 360-degree rotation tube further comprises one or more connectors configured to tightly seal the suction head when the suction head is attached to third tube via the 360-degree rotation tube.

In some embodiments, the 360-degree rotation tube is detachable.

In some embodiments, the first tube of the plurality of tubes is a water pump tube including a water pump hole. The water pump tube is configured to deliver water from the main dental instrument.

In some embodiments, the second tube of the plurality of tubes is configured for an electrical connection to the attachment unit.

In some embodiments, the first tube of the plurality of tubes has a first diameter, the second tube of the plurality of tubes has a second diameter, and the third tube of the plurality of tubes has a third diameter. Herein, the third diameter is larger than the first diameter, and the first diameter is larger than the second diameter.

In some embodiments, the second end of the handle further comprises a screw thread.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
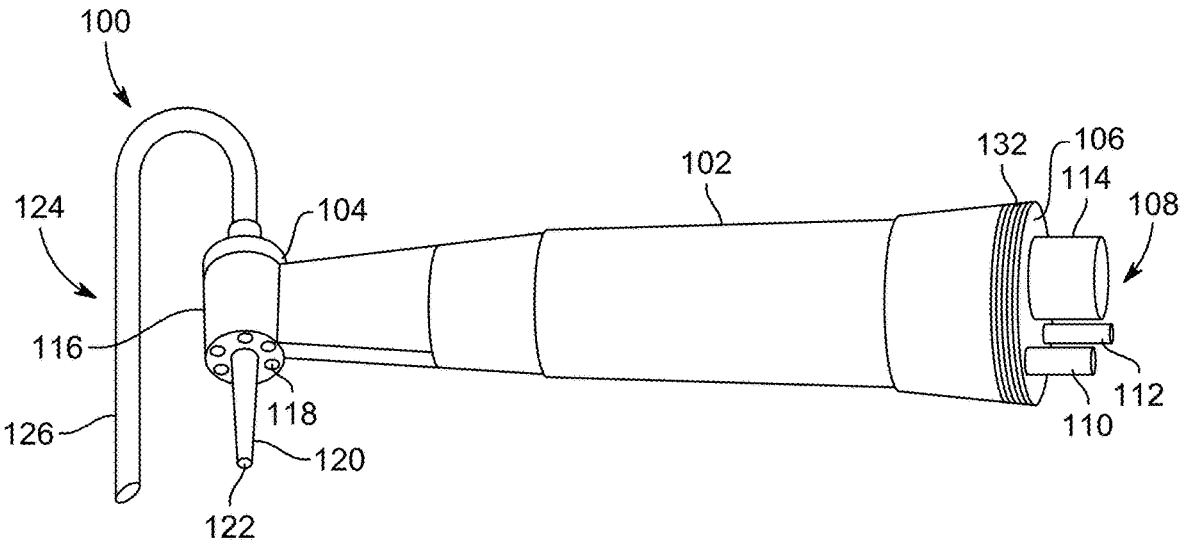
FIG. 1 is an exemplary perspective diagram of a dental handpiece from one side, according to certain embodiments.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a dental handpiece designed to enhance the efficiency and effectiveness of dental procedures. The dental handpiece of the present disclosure addresses limitations of prior-art by integrating multiple functionalities into a single device, thereby reducing the need for multiple instruments and simplifying the dental procedure process. The present dental handpiece incorporates advanced design features that allow for simultaneous drilling and suction operations, effectively overcoming the drawbacks of conventional systems that lack this integrated approach, providing a solution that enhances both the quality of care and the operational efficiency in dental practices.

Figure 2:
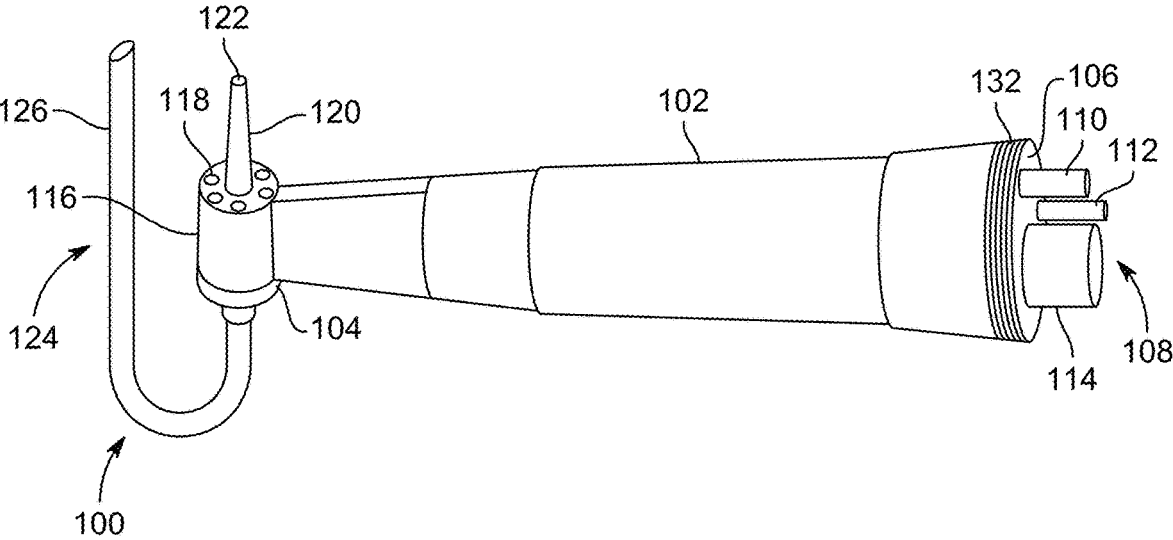
FIG. 2 is an exemplary perspective diagram of the dental handpiece from another side, according to certain embodiments.
Figure 3:
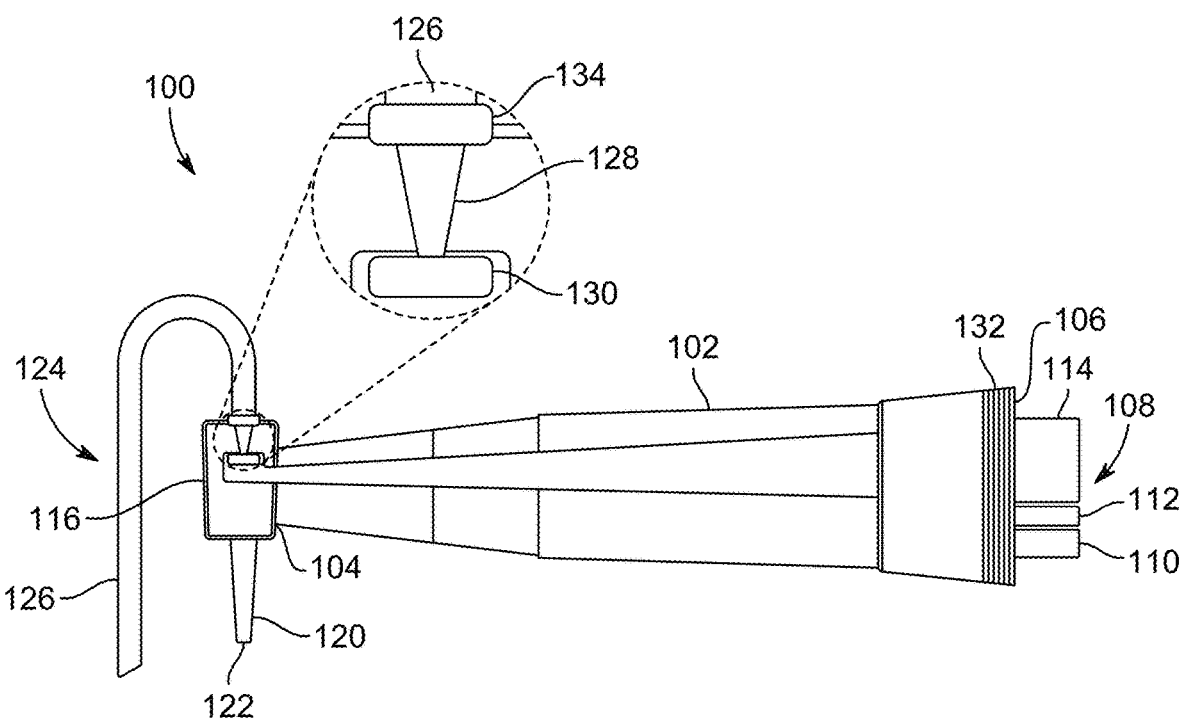
FIG. 3 is an exemplary planar diagram of the dental handpiece showing partial details of inside thereof, according to certain embodiments.
Figure 4:
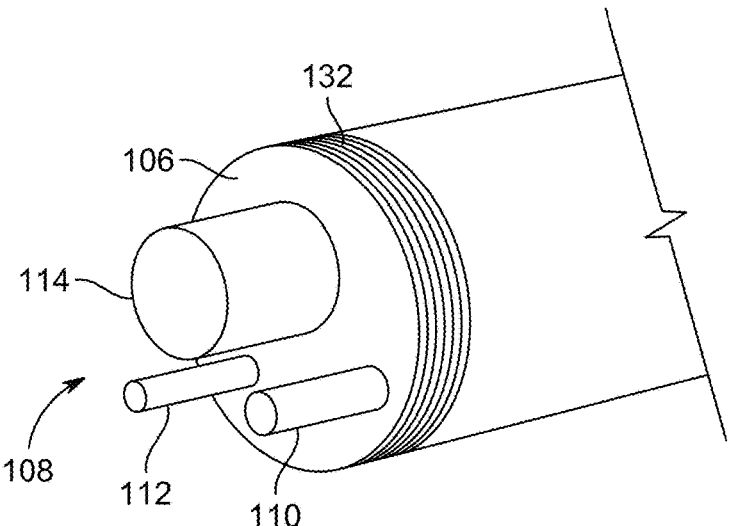
FIG. 4 is an exemplary partial bottom perspective diagram of the dental handpiece, according to certain embodiments.

Referring to FIGS. 1-3 in combination, illustrated are different views of a dental handpiece (as represented by reference numeral 100). The dental handpiece 100 of the present disclosure is designed to enhance the efficiency and effectiveness of dental procedures. The dental handpiece 100 is configured to integrate multiple functionalities, traditionally handled by separate tools, into a singular, compact design. Such configuration of the dental handpiece 100 facilitates simultaneous drilling and suction operations, allowing dental practitioners to perform more complex procedures with greater precision and in less time. This integration simplifies the operational process and also improves patient comfort by reducing the duration and invasiveness of dental treatments. Thereby, the dental handpiece 100 provides both improved functionality and operational ease.

As illustrated, the dental handpiece 100 includes a handle 102. The handle 102 is ergonomically designed to enhance user comfort and control during dental procedures. The handle 102 is designed to fit securely and comfortably in the user's hand, allowing for precise manipulation and stability, as required during delicate dental operations. The handle 102 is balanced to distribute weight evenly, reducing fatigue and improving the dentist's ability to perform prolonged procedures with increased accuracy. As illustrated, the handle 102 has an elongated form with a first end 104 and a second end 106. The handle 102 houses a plurality of tubes 108 extending along the handle 102 from the first end 104 of the handle 102 to the second end 106 of the handle 102. These tubes 108 facilitate the transport of various materials and energies necessary for operations of the dental handpiece 100. In the present configuration, the plurality of tubes 108 includes a first tube 110, a second tube 112, and a third tube 114. Each of the plurality of tubes 108 serves a specific function, such as carrying fluids, air, or electrical connections through the length of the handle 102 in the dental handpiece 100. This internal routing allows to integrate multiple dental tools into a single device, thereby reducing the need for multiple instruments.

Herein, the second end 106 of the handle 102 of the dental handpiece 100 and the plurality of tubes 108 therein, are configured to engage in a main dental instrument (not shown in the provided illustrations). As used herein, the "main dental instrument" refers to a central unit of the dental workflow, which serves as a hub for various dental tools and utilities. The main dental instrument typically houses the necessary elements to supply power, water, and air to connected dental handpieces and other tools. The interface between the second end 106 of the handle 102 and the main dental instrument establishes the dental handpiece 100 as a modular component of a larger dental system such as the Infinity delivery system from Dansereau, Corona, CA. The second end 106 acts as a connection point where the dental handpiece 100 can be attached or detached from the main dental instrument, facilitating integration into the dental workflow. The plurality of tubes 108 extending through the handle 102 provide inputs and outputs, such as water, air, and electrical connections, and are designed to connect with corresponding channels or ports in the main dental instrument. Such connections enable the dental handpiece 100 to draw power, fluids, and other resources from the main dental instrument, thereby enhancing its functionality without the need for self-contained systems.

In the present configuration, the first tube 110 of the plurality of tubes 108 is a water pump tube (with the two terms being interchangeably used hereinafter). The water pump tube 110 includes a water pump hole. The water pump tube 110 is configured to deliver water from the main dental instrument. Such function of the water pump tube 110 is important for a variety of dental procedures, primarily providing a continuous and controlled flow of water to the operational site. Additionally, the water serves to flush out debris created during drilling. Further, the second tube 112 of the plurality of tubes 108 within the handle 102 of the dental handpiece 100 is specifically configured for an electrical connection with the main dental instrument. The second tube 112 provides the necessary electrical power to operate the components in the dental handpiece 100 that require electrical energy to function. By integrating the electrical supply through the second tube 112, the dental handpiece 100 maintains a streamlined design, reducing the clutter of external wires and enhancing the overall ergonomic experience for the dentist.

Further, as illustrated in FIG. 3, the dental handpiece 100 includes a head 116. The head 116 is connected to the first end 104 of the handle 102. FIG. 3 depicts the dental handpiece 100 showing partial details of inside the handle 102 (such as, with a cover removed) at the first end 104 thereof. Herein, the head 116 serves as the primary operational component of the dental handpiece 100, where the actual dental procedures such as drilling and suctioning are executed. The connection between the head 116 and the handle 102 is designed to ensure a secure and stable integration, allowing for the transmission of power and materials from the handle 102 to the head 116. This configuration ensures that all functionalities housed within the handle 102, such as power, water, or suction, are effectively channeled to the head 116, where they are utilized in various dental treatments.

The head 116 includes a fluid nozzle 118. The fluid nozzle 118 is connected to the first tube 110 of the plurality of tubes 108 (not particularly depicted in the associated drawings). Herein, the first tube 110 is designated for transporting fluids, such as water, from the handle 102 to the head 116, where it is used for cooling the drill site and flushing away debris generated during dental procedures. In an example configuration, as may be seen, the fluid nozzle 118 may be in the form of multiple apertures formed in the head 116, preferably multiple apertures disposed symmetrically around the circumference, e.g., 3, 4, 6 or 8 apertures each preferably disposed flush to or recessed in the face of fluid nozzle 118. The integration of the fluid nozzle 118 with the first tube 110 facilitates effective delivery of necessary utilities to the operational area. The fluid nozzle 118, via its connection with the first tube 110, is positioned to deliver water directly to the operational area, ensuring that the drill bit remains at an operating temperature and that the oral cavity is kept clear of any particulate matter. This configuration enhances the safety and comfort of the patient by preventing overheating and improving the visibility and cleanliness of the operational area.

Also as illustrated, the head 116 supports an attachment unit 120. The head 116 also includes a turbine (not visible in the illustrations). The turbine is operatively connected to the attachment unit 120. The attachment unit 120 is specifically designed to engage a dental burr 122 (generally represented in the drawings), which is the component responsible for the actual drilling action during dental procedures. Additionally, the attachment unit 120 is connected to the second tube 112 of the plurality of tubes 108 (not depicted). Herein, the second tube 112, as discussed, facilitates the electrical connection for powering the turbine. The second tube 112 of the plurality of tubes 108 is configured for an electrical connection to the attachment unit 120. The turbine, within the head 116, converts electrical energy supplied via the second tube 112 into mechanical energy that drives the dental burr 122. This enables high-speed rotation of the dental burr 122 for performing dental procedures, like cutting through tooth enamel and other hard tissues. The integration of the turbine with the attachment unit 120 and its connection to the electrical supply through the second tube 112 maximizes the utility of the dental handpiece 100, to provide enhanced performance during dental operations.

Further, the dental handpiece 100 includes a suction system 124. The suction system 124 is configured for suctioning inside an oral cavity including a suction head 126, which helps in removing debris and fluid that accumulate during dental procedures. The suction system 124 is attached to the head 116 of the dental handpiece 100, ensuring that it is positioned to efficiently clear the operational area as the dental procedures are being performed. In the present embodiments, the suction system 124 is attached to an opposite side of the attachment unit 120 of the head 116. This configuration enhances the balance and functionality of the dental handpiece 100 during use. The position of the suction system 124 on the opposite side allows for an unobstructed operation of the dental burr 122 engaged by the attachment unit 120, ensuring that the drilling action is not affected by the suction activity. Thus, this configuration prevents any interference between the suction and drilling functions, allowing both to operate at their maximum efficiency without compromising on performance. Such arrangement further enhances the ergonomic handling of the dental handpiece 100, as it distributes weights of the components evenly across, making it easier and more comfortable for the dentist to maneuver the dental handpiece 100 within the confines of the oral cavity. In some embodiments, the suction system 124 can be positioned on the same side of the dental burr 122, the left side of the head 116, or the right side of the head 116.

In the dental handpiece 100, the suction head 126 is connected to the third tube 114 of the plurality of tubes 108 (connection, not depicted). Herein, the third tube 114 is specifically utilized for the suction function. The suction head 126 is connected to the third tube 114 of the plurality of tubes 108 via a 360-degree rotation tube 128 (as better shown in a zoomed-in portion of FIG. 3). Such connection allows the suction head 126 to rotate fully around axis of the 360-degree rotation tube 128, providing maneuverability within the oral cavity. This ability of the 360-degree rotation tube 128 to rotate completely provides that the suction head

126 can reach all areas of the mouth, enabling various positioning during dental procedures. Thus, the integration of the 360-degree rotation tube 128 with the suction head 126 provides dentists with enhanced control while maintaining a clear operational field.

In some embodiments, the suction head 126 is U-shaped. This U-shape of the suction head 126 allows for greater flexibility and range of motion, facilitating various positioning during dental procedures. The U-shaped configuration allows the suction head 126 to maneuver around various angles and positions within the oral cavity, increasing the effectiveness of the suction process. Further, in some embodiments, the suction head 126 and/or 360-degree rotation tube 128 is detachable. The ability to detach the suction head 126 and/or the 360-degree rotation tube 128 allows for its thorough cleaning and sterilization, for preventing cross-contamination and ensuring the overall safety of dental procedures. Moreover, the detachability facilitates easy replacement or repair of the suction head 126 and/or the 360-degree rotation tube 128 if needed, enhancing the longevity of the dental handpiece 100.

In an embodiment, the third tube 114 of the plurality of tubes 108 in the dental handpiece 100 includes a connector 130, 134. The connector 130, 134 is specifically designed to tightly close the second tube 112 when the 360-degree rotation tube 128 is detached. The inclusion of connector 130, 134 ensures that, even in the absence of the 360-degree rotation tube 128, the internal systems of the dental handpiece 100, particularly those related to the second tube 112, which is used for electrical connections, remain protected. This protection prevents debris, dust, or other contaminants from entering the second tube 112, which could potentially compromise the functionalities of the dental handpiece 100. This mechanism may further prevent the entry of fluids or debris into the third tube 114 when the suction system 124 is not in use, maintaining the hygiene and preventing potential damage to the dental handpiece 100. In general, the incorporation of the connector 130, 134 functionality maintains the integrity and operation of the dental handpiece 100 when components are removed for maintenance or replacement. In some embodiments, the connector 130, 134 may comprise or may be a cover tightly closing the cavity when the suction head 126 and/or the 360-degree rotation tube 128 is detached. In another embodiments, the connector 130, 134 can be a push-to-connect fitting, a tube fitting, a pressure fitting, a crimp fitting, an O-ring, a valve, a threaded connector, a welded connector, a compression connector, or a flanged connector, as non-limiting examples. In yet another embodiments, the materials of the connector 130, 134 can be a rubber, a Polyvinyl Chloride (PVC), a Chlorinated Polyvinyl Chloride (CPVC), a copper, a stainless steel, a brass, or a Cross-linked Polyethylene (PEX), as non-limiting examples. In yet other embodiments, the type and the material of the connector 130 can be same with or different from those of the connector 134.

In the dental handpiece 100, the dimensions of the plurality of tubes 108 housed within the handle 102 are selected to enhance their respective functions. Herein, the first tube 110 of the plurality of tubes has a first diameter, the second tube 112 has a second diameter, and the third tube 114 has a third diameter. Specifically, the third diameter is larger than the first diameter. That is, the third tube 114, which is configured for suction purposes, has larger diameter compared to the diameter of the first tube 110. This larger third diameter allows a greater volume of air and debris to be sucked efficiently from the oral cavity, for maintaining a clean working area during dental procedures. The increased size facilitates the removal of debris and fluids more effectively, enhancing the overall functionality of the suction system 124. Further, the first diameter is larger than the second diameter. That is, the first tube 110, which is configured to deliver water, has a diameter larger than that of the second tube 112, to ensure an adequate flow of water for cooling and cleaning the operational area. It may be appreciated that the second tube 112, configured for electrical connections, has the smallest diameter, sufficient for housing the necessary electrical wiring and connections, efficiently arranging space within the handle 102 of the dental handpiece 100.

Also, as illustrated, the second end 106 of the handle 102 further preferably includes a screw thread 132. The screw thread 132 facilitates a secure connection between the handle 102 of the dental handpiece 100 and the main dental instrument or other compatible accessories. The screw thread 132 allows for the precise alignment of the handle 102 of the dental handpiece 100 with the main dental instrument. The screw thread 132 also allows for easy attachment and detachment, enabling quick configuration changes and maintenance, for efficient dental operations. The use of a screw thread 132 at the second end 106 of the handle 102 ensures that the connection provides a mechanical link that can withstand the vibrations and torque generated during dental procedures. This helps in maintaining the integrity of the electrical and fluid connections that run through the plurality of tubes 108 within the handle 102 to the head 116 of the dental handpiece 100.

The dental handpiece 100 of the present disclosure includes the handle 102 that houses the plurality of tubes 108, extending from the first end 104 to the second end 106 of the handle 102. Each of the plurality of tubes 108 serves distinct purposes: the first tube 110 being the water pump tube, delivering water from the main dental instrument, the second tube 112 provides the electrical connection from the main dental instrument, and the third tube 114 facilitates the suction of debris and fluids from the oral cavity. The specific diameters of the tubes are configured for their respective functions: the first tube 110 for water delivery, the second tube 112 for electrical connectivity, and the third tube 114 for efficient suction. The head 116 of the dental handpiece 100, connected to the first end 104 of the handle 102, includes the fluid nozzle 118 connected to the first tube 110 and the turbine that is operatively connected to the attachment unit 120, configured to engage the dental burr 122. The attachment unit 120 is also connected to the second tube 112. The dental handpiece 100 also features the suction system 124 attached to the head 116, which includes the suction head 126 connected to the third tube 114 via the 360-degree rotation tube 128. The suction system 124 is configured on the opposite side of the attachment unit 120.

The dental handpiece 100 is designed to enhance maneuverability and ease of use within the dental setting. The suction head 126, which is U-shaped and detachable, provides the capability to adjust the position of the suction head 126 effectively, enabling access to various parts of the oral cavity. This feature ensures that the suction system 124 can operate efficiently without interfering with the functioning of the dental burr 122 engaged by the attachment unit 120. The third tube 114 includes the connector 130, 134 that securely closes the second tube 112 when the suction head 126 and/or the 360-degree rotation tube 128 is detached, maintaining the integrity of the system during maintenance or configuration changes. The second end 106 of the handle 102 includes the screw thread 132 for secure attachment to the main dental instrument. This arrangement of components and systems in the dental handpiece 100 facilitates integrated drilling and suction functionality within a single unit, enhancing operational efficiency and reducing procedural time in dental care.

The dental handpiece 100 of the present disclosure is designed to be highly versatile, supporting a wide range of dental procedures by accommodating various dental burrs and attachments. The attachment unit 120, integrated within the head 116, is specifically configured to engage with standard dental burr shanks, facilitating the quick and easy interchangeability of attachments. This allows dental professionals to adapt the dental handpiece 100 for different treatments quickly, enhancing procedural efficiency. The head 116 of the dental handpiece 100 may also be equipped with additional features to enhance operational performance, such as extra water spray nozzles and air vents. These additions are intended to enhance the cooling of the drill site and aid in the more effective removal of debris, thereby maintaining a clear field of operation. Furthermore, the suction system 124 of the dental handpiece 100 may include optional enhancements, such as a filter or trap designed to collect debris. This feature prevents the clogging of the suction pathway, ensuring that the suction system 124 remains effective and operational throughout dental procedures. These optional components and modifications contribute to the overall utility and functionality of the dental handpiece 100, making it a comprehensive tool for modern dental care.

In one aspect of the dental handpiece, the 360-degree rotation tube 128 has a conical shape with a broad end disposed towards the top connector 134 and the narrow end disposed towards the lower connector 130. During suction operations, the suction head 126 seats into the head of the dental handpiece thereby forming a seal thereby avoiding egress of fluids at the connecting point. The cone shaped rotation tube 128 is deformable and preferably includes a recess proceeding along the central axis of the rotation tube 128 on an outer surface. The recess preferably begins above end 130 and gradually deepens or widens as the recess proceeds towards top connector 134. In this configuration, a user may apply pressure at the vertex of the suction head 126 thereby advancing the rotation tube 128 forward and exposing the recess and opening an aperture in the dental head to permit entry of air to reduce the suction vacuum pressure at the end of the suction head 126. In this manner, a dentist or oral hygienist may gently and precisely regulate the vacuum by application of thumb or finger pressure at the vertex of the suction head 126.

The dental handpiece 100 is designed to be easy to clean and sterilize, ensuring enhanced hygiene and infection control. The detachable components, such as the 360-degree rotation tube 128 and the suction head 126, can be easily removed for thorough cleaning and sterilization. The dental handpiece 100 also includes safety features to protect both the patient and the dentist. For example, the dental handpiece 100 may include a mechanism to prevent accidental activation of the dental burr 122 or other attachment when not in use. The dental handpiece 100 may also include a safety clutch to prevent damage to the motor or other components in case of excessive force or resistance during a procedure. The materials used to construct the dental handpiece 100 may be selected based on specific design requirements or preferences. In general, the materials used to construct the dental handpiece 100 are preferably bio-compatible and resistant to corrosion. The handle 102 may be made of stainless steel or a similar durable material. The plurality of tubes 108 may be made of flexible, kink-resistant material such as silicone or rubber. Further, the number and configuration of the tubes 108 in the handle 102 may be modified to accommodate different types of main dental instruments. The head 116 may be made of a lightweight material such as aluminum or titanium. Further, the shape and size of the suction head 126 may be varied to enhance suction performance for different procedures.

The dental handpiece 100 of the present disclosure simplifies dental procedures, improves efficiency, and enhances patient comfort. The dental handpiece 100 with the integrated suction system 124 that offers improved efficiency, ease of use, and flexibility compared to conventional dental handpieces. The integrated suction system 124 eliminates the need for a separate suction device, streamlining dental procedures and reducing the risk of complications. The 360-degree rotation tube 128 allows for various positioning of the suction head 126, ensuring effective removal of debris and fluids from the oral cavity. The detachable the suction head 126, 360-degree rotation tube 128, and the connector 130, 134 further enhance versatility and hygiene of the dental handpiece 100. By combining drilling and suction capabilities in a single unit, the dental handpiece 100 reduces the need for multiple instruments, streamlining dental procedures and minimizing the clutter at the dental station. This integration helps in saving time and enhancing the workflow during dental treatments.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A dental handpiece for drilling and suctioning comprising:
a handle including a plurality of tubes extending along the handle from a first end of the handle to a second end of the handle;
a head including a fluid nozzle, wherein the fluid nozzle is connected to a first tube of the plurality of tubes, the head further including a turbine operatively connected to an attachment unit, wherein the attachment unit is configured to engage a dental burr and the attachment unit is connected to a second tube of the plurality of tubes which is configured for electrical connection with an electrical supply, wherein the head is connected to the first end of the handle; and
a suction system for suctioning inside an oral cavity including a suction head, wherein the suction system is attached to the head and wherein the suction head is connected to a third tube of the plurality of tubes via a 360-degree rotation tube configured to rotate the suction head;
wherein the second end of the handle and the plurality of tubes are configured to engage in a main dental instrument.

2. The dental handpiece of claim 1, wherein the suction system is attached to an opposite side of the attachment unit of the head.

3. The dental handpiece of claim 2, wherein the suction head is U-shaped.

4. The dental handpiece of claim 2, wherein the suction head is detachable.

5. The dental handpiece of claim 1, wherein the 360-degree rotation tube has a conical shape.

6. The dental handpiece of claim 1, wherein the first tube of the plurality of tubes is a water pump tube including a water pump hole, wherein the water pump tube is configured to deliver water from the main dental instrument.

7. The dental handpiece of claim 1, wherein the first tube of the plurality of tubes has a first diameter, the second tube of the plurality of tubes has a second diameter, and the third tube of the plurality of tubes has a third diameter, wherein the third diameter is larger than the first diameter, and wherein the first diameter is larger than the second diameter.

8. The dental handpiece of claim 1, wherein the second end of the handle further comprises a screw thread.

* * * * *